(12) United States Patent
Ahn (10) Patent No.: US 11,355,798 B2
(45) Date of Patent: Jun. 7, 2022

(54) DEVICE FOR COOLING BATTERY PACK

(71) Applicant: SAMSUNG SDI CO., LTD., Yongin-si (KR)

(72) Inventor: Sanghyeok Ahn, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 16/496,656

(22) PCT Filed: Jan. 30, 2018

(86) PCT No.: PCT/KR2018/001267
§ 371 (c)(1),
(2) Date: Sep. 23, 2019

(87) PCT Pub. No.: WO2018/174400
PCT Pub. Date: Sep. 27, 2018

(65) Prior Publication Data
US 2020/0381791 A1 Dec. 3, 2020

(30) Foreign Application Priority Data
Mar. 21, 2017 (KR) .................. 10-2017-0035509

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/655* (2015.04);
(Continued)

(58) Field of Classification Search
None
See application file for complete search history.

(56) References Cited

U.S. PATENT DOCUMENTS 9,957,153 B2    5/2018  Kajdas et al.
10,243,181 B2   3/2019  Zhao et al.
(Continued)

FOREIGN PATENT DOCUMENTS

CN    105489796 A    4/2016
CN    106129292 A    11/2016
(Continued)

OTHER PUBLICATIONS

Machine Translation of KR-20160076121-A from Espacenet originally published to Kim Jun. 2016 (Year: 2016).*
(Continued)

*Primary Examiner* — Ula C Ruddock
*Assistant Examiner* — Mary Grace Byram
(74) *Attorney, Agent, or Firm* — Lee IP Law, P.C.

(57) ABSTRACT

An embodiment of the present disclosure provides a device for cooling a battery pack, the device including: a housing including flow passages extending in a first direction; a first sub-housing provided on the housing in the first direction; and a second sub-housing arranged opposite the first sub-housing in the first direction and provided on the housing, wherein the first sub-housing includes a first coupling hole communicating with one of the flow passages and a first guide hole communicating with at least one of the flow passages, the second sub-housing includes a second coupling hole communicating with one of the flow passages and a second guide hole communicating with at least one of the flow passages, and a path of a fluid flowing in the flow passages varies according to installation positions of coupling members inserted into the first and second coupling holes.

16 Claims, 8 Drawing Sheets

(51) Int. Cl.
    *H01M 10/6563*     (2014.01)
    *H01M 2/10*     (2006.01)
    *H01M 2/08*     (2006.01)
    *H01M 50/20*     (2021.01)
    *H01M 50/183*     (2021.01)
    *H01M 10/655*     (2014.01)

(52) U.S. Cl.
    CPC ..... *H01M 10/6563* (2015.04); *H01M 50/183* (2021.01); *H01M 50/20* (2021.01)

(56) References Cited

U.S. PATENT DOCUMENTS

| | | | |
|---|---|---|---|
| 2009/0142650 | A1 | 6/2009 | Okada et al. |
| 2011/0132580 | A1* | 6/2011 | Herrmann ............ F28D 1/0478 165/104.33 |
| 2012/0088132 | A1 | 4/2012 | Ahn |
| 2014/0302371 | A1* | 10/2014 | Miyawaki ........... H01M 10/613 429/120 |
| 2014/0322580 | A1* | 10/2014 | Yang ..................... H01M 50/20 429/120 |
| 2014/0356662 | A1 | 12/2014 | Yang et al. |
| 2015/0064522 | A1 | 3/2015 | Kim |
| 2017/0309980 | A1 | 10/2017 | Hong et al. |
| 2019/0260102 | A1 | 8/2019 | Schmiedhofer et al. |

FOREIGN PATENT DOCUMENTS

| | | | |
|---|---|---|---|
| CN | 109891666 | A | 6/2019 |
| DE | 10-2011-002666 | A1 | 7/2012 |
| DE | 10-2011-104433 | A1 | 7/2012 |
| EP | 3 467 934 | A1 | 4/2019 |
| JP | 2010-092723 | A | 4/2010 |
| JP | 5183171 | B2 | 4/2013 |
| JP | 2016-091951 | A | 5/2016 |
| KR | 10-2013-0005004 | A | 1/2013 |
| KR | 10-2013-0025244 | A | 3/2013 |
| KR | 10-1325201 | B1 | 11/2013 |
| KR | 10-2014-0140678 | A | 12/2014 |
| KR | 10-2015-0025560 | A | 3/2015 |
| KR | 20150044599 | A * | 4/2015 |
| KR | 10-1614688 | B1 | 4/2016 |
| KR | 10-2016-0076121 | A | 6/2016 |
| KR | 20160076121 | A * | 6/2016 |
| KR | 10-2016-0091951 | A | 8/2016 |
| KR | 10-2016-0104685 | A | 9/2016 |

OTHER PUBLICATIONS

Machine Translation of KR-20160076121-A from Espacenet originally published to Kim on Jun. 2016 (Year: 2016).*
Machine Translation of KR-20150044599-A from Espacenet originally published to Kang on Apr. 2015 (Year: 2015).*
International Search Report dated May 14, 2018 for PCT/KR2018/001267 filed Jan. 30, 2018.
Extended European Search Report dated Nov. 3, 2020 for corresponding European Patent Application No. 18770395.4.
Korean Office action dated Mar. 19, 2021 for corresponding KR Patent Application No. 10-2017-0035509. All references previously cited.
European Office action dated Jun. 25, 2021 for corresponding EP Patent Application No. 18770395.4.
Korean Notice of Allowance dated Sep. 15, 2021 for corresponding KR Patent Application No. 10-2017-0035509.
Chinese Office action dated Apr. 1, 2022 for corresponding CN Patent Application No. 201880019793.8.

* cited by examiner

DEVICE FOR COOLING BATTERY PACK

CROSS-REFERENCE TO THE RELATED APPLICATION

This is the U.S. national phase application based on PCT Application No. PCT/KR2018/001267, filed Jan. 30, 2018, which is based on Korean Patent Application No. 10-2017-0035509, filed Mar. 21, 2017, the entire contents of all of which are hereby incorporated by reference.

TECHNICAL FIELD

Embodiments of the present disclosure relate to a device for cooling a battery pack.

BACKGROUND ART

Unlike primary batteries, secondary batteries are rechargeable and are widely used in small high-tech electronic devices such as cellular phones, PDAs, and laptop computers, and energy storage systems as well.

When a secondary battery is charged and discharged, heat is generated from the secondary battery, and thus, if such a secondary battery is not properly cooled, cells of the secondary battery may be damaged such that internal materials may leak or the cells may explode in severe cases.

The above-described background art is technical information that the inventor had or learned when or while deriving embodiments of the present disclosure and may not have been publicly known before the filing of the present application.

DESCRIPTION OF EMBODIMENTS

Technical Problem

Embodiments of the present disclosure provide battery pack cooling devices configured to easily change a cooling method according to a required degree of cooling performance for a battery pack by improving the structure of a housing.

Solution to Problem

An embodiment of the present disclosure provides a device for cooling a battery pack, the device including: a housing including a plurality of flow passages extending in a first direction; a first sub-housing provided on the housing in the first direction; and a second sub-housing arranged opposite the first sub-housing in the first direction and provided on the housing, wherein the first sub-housing includes a first coupling hole communicating with one of the plurality of flow passages and a first guide hole communicating with at least one of the plurality of flow passages, the second sub-housing includes a second coupling hole communicating with one of the plurality of flow passages and a second guide hole communicating with at least one of the plurality of flow passages, and a path of a fluid flowing in the plurality of flow passages varies according to installation positions of coupling members inserted into the first and second coupling holes.

Advantageous Effects of Disclosure

According to the battery pack cooling device of embodiments of the present disclosure, the first and second sub-housings having different structures may be installed on lateral sides of the housing in a replaceable manner according to a required degree of cooling performance for battery cells, and thus cooling methods may be selectively applied.

However, the scope of the present disclosure is not limited to these effects.

BEST MODE

An embodiment of the present disclosure provides a device for cooling a battery pack, the device including: a housing including a plurality of flow passages extending in a first direction; a first sub-housing provided on the housing in the first direction; and a second sub-housing arranged opposite the first sub-housing in the first direction and provided on the housing, wherein the first sub-housing includes a first coupling hole communicating with one of the plurality of flow passages and a first guide hole communicating with at least one of the plurality of flow passages, the second sub-housing includes a second coupling hole communicating with one of the plurality of flow passages and a second guide hole communicating with at least one of the plurality of flow passages, and a path of a fluid flowing in the plurality of flow passages varies according to installation positions of coupling members inserted into the first and second coupling holes.

In the embodiment, the device may further include: a first sealing member between the housing and the first sub-housing; and a second sealing member between the housing and the second sub-housing.

In the embodiment, the first and second sealing members may include a plurality of communication holes that communicate with the plurality of flow passages.

In the embodiment, the first and second coupling holes may not be aligned with each other in the first direction.

In the embodiment, the first sub-housing may further include: a first inlet through which the fluid is introduced and which overlaps at least one of the plurality of flow passages in the first direction; and a first outlet through which the fluid is discharged and which overlaps at least one of the plurality of flow passages in the first direction, wherein the first inlet and the first outlet may be provided on both sides of the first sub-housing in a second direction crossing the first direction.

In the embodiment, the first and second guide holes partially may overlap each other in the first direction.

In the embodiment, the first guide may not penetrate the first sub-housing, and the second guide hole may not penetrate the second sub-housing.

In the embodiment, the first and second coupling holes may overlap each other in the first direction, and the first and second guide holes may overlap each other in the first direction.

In the embodiment, the first guide hole may penetrate the first sub-housing in the first direction and may be partially open in a second direction crossing the first direction such that a portion of the fluid introduced into the first guide hole may be guided to some of the plurality of flow passages in the first direction and another portion of the fluid introduced into the first guide hole may be guided in the second direction to a first internal chamber provided in the first sub-housing, and the second guide hole may penetrate the second sub-housing in the first direction and may be partially open in the second direction such that a portion of the fluid delivered from the plurality of flow passages to the second guide hole may be discharged outside and another portion of the fluid delivered from the plurality of flow passages to the second guide hole may be guided to a second internal chamber provided in the second sub-housing.

In the embodiment, the second sub-housing may further include a second outlet through which the fluid is discharged outside, wherein the first guide hole may penetrate the first sub-housing in the first direction and may be partially open in a second direction crossing the first direction such that a portion of the fluid introduced into the first guide hole may be guided to some of the plurality of flow passages in the first direction and another portion of the fluid introduced into the first guide hole may be guided in the second direction to a first internal chamber provided in the first sub-housing, the second guide hole may not penetrate the second sub-housing in the first direction and may be partially open in the second direction such that the fluid delivered from the plurality of flow passages to the second guide hole may be guided to a second internal chamber provided in the second sub-housing, and the fluid collected in the second internal chamber may be discharged outside through the second outlet.

In the embodiment, the device may further include a blower member provided in at least one of the first and second internal chambers.

Another embodiment of the present disclosure provides a device for cooling a battery pack, the device including: a housing including a plurality of flow passages extending in a first direction; a first sub-housing provided on the housing in the first direction; and a second sub-housing arranged opposite the first sub-housing in the first direction and provided on the housing, wherein the first sub-housing includes a first coupling hole communicating with one of the plurality of flow passages and a first guide hole communicating with at least one of the plurality of flow passages, the second sub-housing includes a second coupling hole communicating with one of the plurality of flow passages and a second guide hole communicating with at least one of the plurality of flow passages, and a coupling member is inserted into at least one of the plurality of flow passages to connect together the plurality of flow passages, the first guide hole, and the second guide hole in such a manner that a fluid turns at least once while flowing therein.

Another embodiment of the present disclosure provides a device for cooling a battery pack, the device including: a housing including a plurality of flow passages extending in a first direction; a first sub-housing provided on the housing in the first direction; and a second sub-housing arranged opposite the first sub-housing in the first direction and provided on the housing, wherein the first sub-housing includes a first coupling hole communicating with one of the plurality of flow passages and a first guide hole communicating with at least one of the plurality of flow passages, the second sub-housing includes a second coupling hole communicating with one of the plurality of flow passages and a second guide hole communicating with at least one of the plurality of flow passages, and a coupling member is inserted into at least one of the plurality of flow passages to connect together the first guide hole, the plurality of flow passages, and the second guide hole in such a manner that a fluid flows straight in the first direction.

Other aspects, characteristics, and advantages will become apparent and more readily appreciated from the accompanying drawings, claims, and detailed description.

Mode of Disclosure

The present disclosure may be variously modified, and various embodiments may be provided according to the present disclosure. Hereinafter, some embodiments will be illustrated in the accompanying drawings and described in detail. Effects and features of the present disclosure, and implementation methods thereof will be clarified through the following embodiments described in detail with reference to the accompanying drawings. However, the present disclosure is not limited to the following embodiments but may be implemented in various forms.

In the following embodiments, it will be understood that although terms such as "first" and "second" are used to describe various elements, these elements should not be limited by these terms. These terms are only used to distinguish one element from another. The terms of a singular form may include plural forms unless referred to the contrary. In addition, terms such as "include" or "comprise" specify features or the presence of stated elements, but do not exclude other features or elements.

In the drawings, the sizes of elements may be exaggerated for clarity. For example, in the drawings, the size or thickness of each element may be arbitrarily shown for illustrative purposes, and thus the present disclosure should not be construed as being limited thereto.

Hereinafter, embodiments of the present disclosure will be described in detail with reference to the accompanying drawings. In the following description given with reference to the accompanying drawings, the same elements or corresponding elements are denoted with the same reference numerals, and overlapping descriptions thereof will be omitted.

Figure 1:
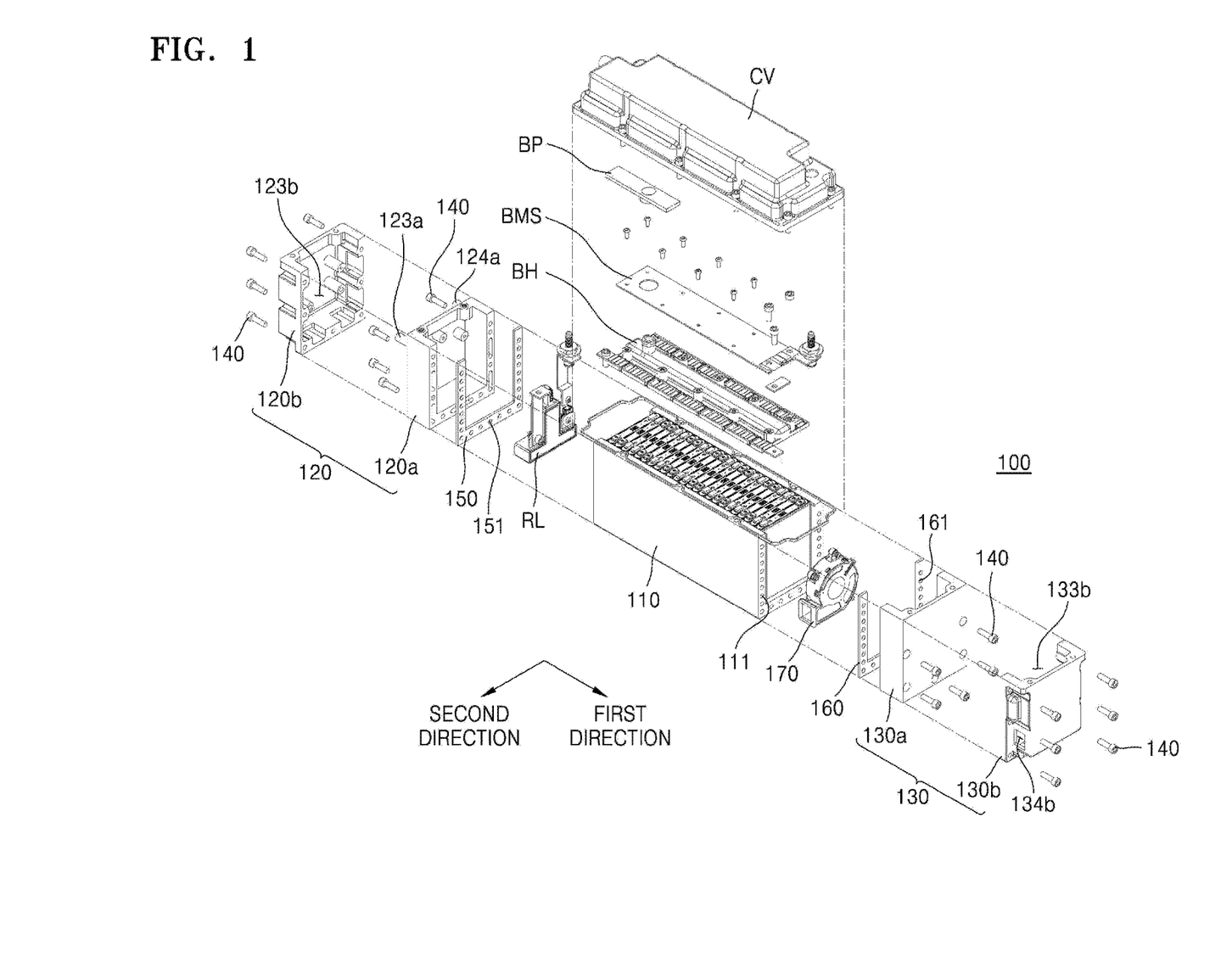
FIG. 1 is an exploded perspective view illustrating a battery pack cooling device according to an embodiment of the present disclosure.
Figure 2:
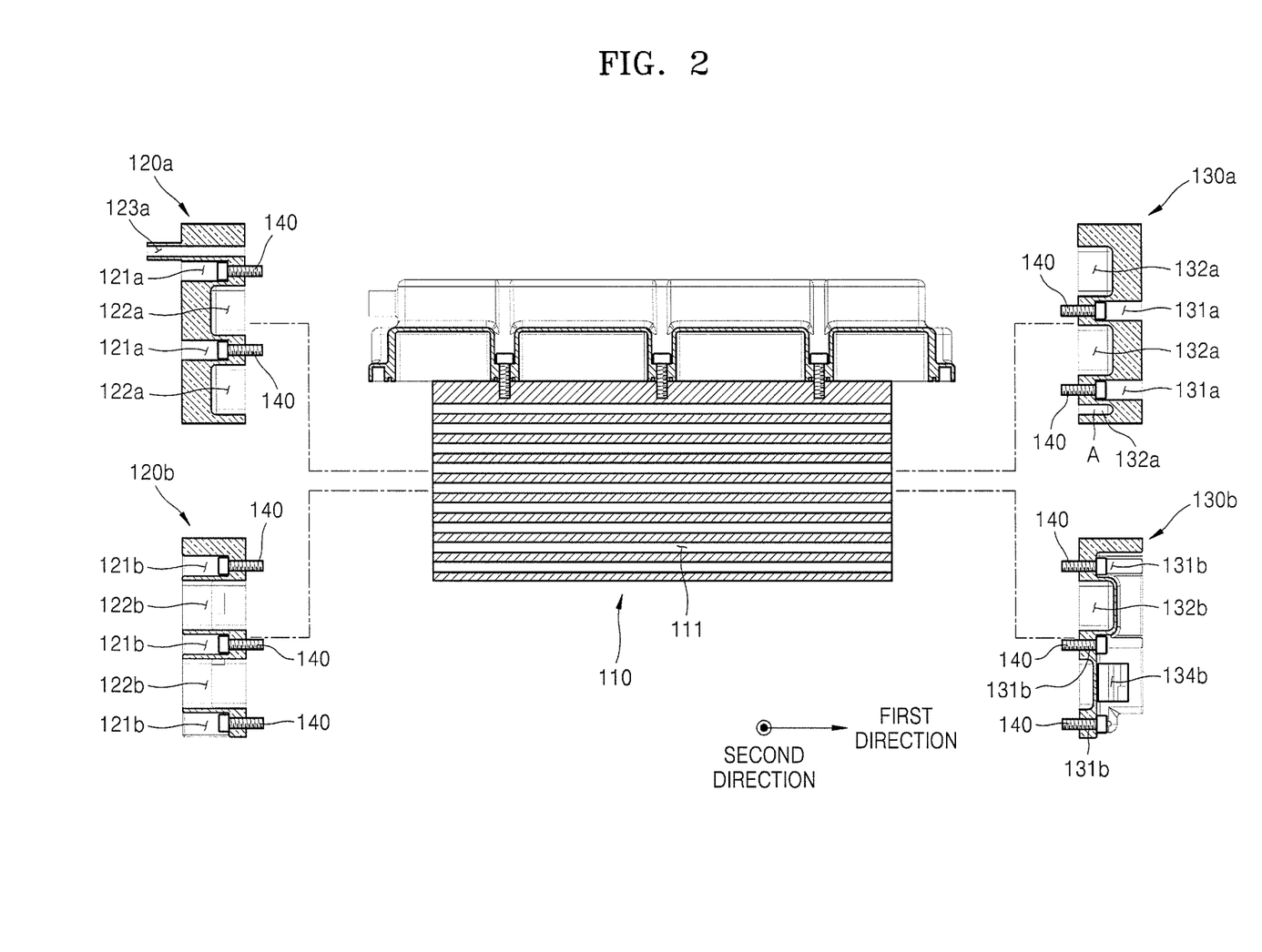
FIG. 2 is an exploded side view schematically illustrating a coupling structure of a housing, a first sub-housing, and a second sub-housing of the battery pack cooling device shown in FIG. 1.

FIG. 1 is an exploded perspective view illustrating a battery pack cooling device according to an embodiment of the present disclosure, and FIG. 2 is an exploded side view schematically illustrating a coupling structure of a housing, a first sub-housing, and a second sub-housing of the battery pack cooling device shown in FIG. 1.

Referring to FIGS. 1 and 2, according to the embodiment of the present disclosure, a battery pack cooling device 100 may include a housing 110, a first sub-housing 120, a second sub-housing 130, coupling members 140, a first sealing member 150, and a second sealing member 160.

The housing 110 may have a box shape to accommodate battery cells C and may include a plurality of flow passages 111 extending in a first direction. The flow passages 111 may be formed in the housing 110 in such a manner that the flow passages 111 may extend in the first direction while being arranged on both sides and lower sides of the battery cells C and may be open in the first direction. A fluid may flow through the flow passages 111 and may have a function of absorbing heat generated from the battery cells C and dissipating the heat to the outside while flowing through the flow passages 111.

Here, the fluid may be water or air. For example, when water is used as the fluid, the battery pack cooling device 100 may be referred to as a "water cooling type" battery pack cooling device 100, and when air is used as the fluid, the battery pack cooling device 100 may be referred to as an "air cooling type" battery pack cooling device 100.

A bus bar holder BH, which is electrically connected to terminals of the battery cells C, may be coupled to an upper surface of the housing 110, and a battery management system BMS, which includes a circuit for generally managing the charge and discharge operations and safety of the battery cells C, may be coupled to an upper side of the bus bar holder BH. The battery management system BMS may be provided with a first terminal member (not shown) which protrudes upward for interconnection with the outside of the battery cells C. A baffle plate BP may be provided on an upper side of the battery management system BMS, and in this case, the bus bar holder BH, the battery management system BMS, and the baffle plate BP may respectively include open holes (not shown) such that the bus bar holder BH, the battery management system BMS, and the baffle plate BP may communicate with each other to discharge gas generated from the battery cells C toward a cover CV.

In addition, a relay RL having a function of forming an electrical short circuit between the battery cells C and the bus bar holder BH in an emergency may be provided on a lateral surface of the housing 110, and a second terminal member (not shown) facing the first terminal member in the first direction may be provided on the relay RL. In this case, the first terminal member and the second terminal member may protrude upward through installation holes (not shown) formed in the cover CV and may respectively function as a positive pole and a negative pole.

The first sub-housing 120 may be provided on a side of the housing 110 in the first direction, and the second sub-housing 130 may be provided on the other side of the housing 110 in the first direction. That is, the second sub-housing 130 may be opposite the first sub-housing 120 with the housing 110 therebetween in the first direction.

Specifically, the first sub-housing 120 may include a first coupling hole 121 communicating with one of the flow passages 111 formed in the housing 110 and a first guide hole 122 communicating with at least one of the flow passages 111.

In addition, the second sub-housing 130 may include a second coupling hole 131 communicating with one of the flow passages 111 and a second guide hole 132 communicating with at least one of the flow passages 111.

FIGS. 1 and 2 show two first sub-housings 120a and 120b, and two second sub-housings 130a and 130b. Here, a pair corresponding to reference numerals 120a and 130a, that is, the first sub-housings 120a and the second sub-housings 130a, may constitute a first set, and the other pair corresponding to reference numerals 120b and 130b, that is, the first sub-housing 120b and the second sub-housing 130b, may constitute a second set.

As will be described in detail below, the first set and the second set may be coupled to the housing 110 in a replaceable manner. That is, when the first sub-housing 120a and the second sub-housing 130a corresponding to the first set are installed on both sides of the housing 110, the battery pack cooling device 100 of the embodiment of the present disclosure may function as a "water cooling type" battery pack cooling device 100 that uses water as a fluid. In addition, when the first sub-housing 120b and the second sub-housing 130b corresponding to the second set are installed on both sides of the housing 110, the battery pack cooling device 100 of the embodiment of the present disclosure may function as an "air cooling type" battery pack cooling device 100 that uses air as a fluid.

That is, according to the configuration of the battery pack cooling device 100 of the embodiment of the present disclosure, the method of cooling the battery cells C accommodated in the housing 110 may be simply changed by selectively installing, on the housing 110, one of the first set including the first sub-housing 120a and the second sub-housing 130a and the second set including the first sub-housing 120b and the second sub-housing 130b.

The coupling members 140 may be inserted into the first coupling hole 121 and the second coupling hole 131. Each of the coupling members 140 respectively inserted into the first coupling hole 121 and the second coupling hole 131 may close a side of one of the flow passages 111 that communicates with the first coupling hole 121 and the second coupling hole 131. According to this structure, the path of a fluid flowing along the flow passages 111 may vary according to the installation positions of the coupling members 140 inserted into the first coupling hole 121 and the second coupling hole 131. This will be described in detail with reference to FIGS. 3 to 7.

In addition, the first sealing member 150 may be placed between the housing 110 and the first sub-housing 120, and the second sealing member 160 may be placed between the housing 110 and the second sub-housing 130.

The first sealing member 150 and the second sealing member 160 are structures for preventing leakage of a fluid between the housing 110 and the first sub-housing 120 or between the housing 110 and the second sub-housing 130 when the fluid flows along the first guide hole 122, the flow passages 111, and the second guide hole 132, or along the second guide hole 132, the flow passages 111, and the first guide hole 122. The first sealing member 150 and the second sealing member 160 may include a material having a certain degree of elasticity. In addition, the first sealing member 150 and the second sealing member 160 include a plurality of communication holes 151 and 161 communicating with the flow passages 111 such that a fluid may flow through the first sealing member 150 and the second sealing member 160.

In detail, when the housing 110 and the first sub-housing 120 (or the second sub-housing 130) are coupled to each other using the coupling member 140, the first sealing member 150 (or the second sealing member 160) may be pressed and compressed as the first sub-housing 120 (or the second sub-housing 130) is moved toward the housing 110. The compressed first sealing member 150 (or the second sealing member 160) may expand owing to the resilience thereof, and thus a gap between the housing 110 and the first sub-housing 120 (or the second sub-housing 130) may be filled, thereby preventing leakage of a fluid flowing from the housing 110 to the first sub-housing 120 (or the second sub-housing 130).

Figure 3:
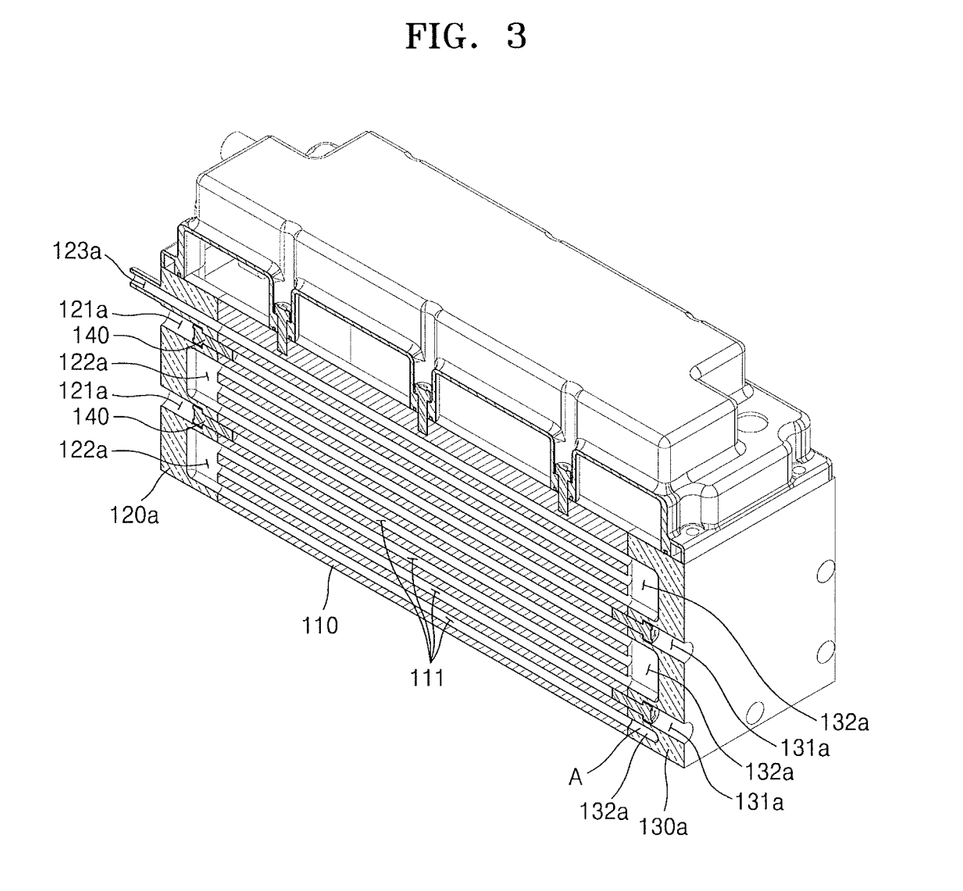
FIG. 3 is a cut-away perspective view illustrating a first coupling structure of the battery pack cooling device shown in FIG. 1.
Figure 4:
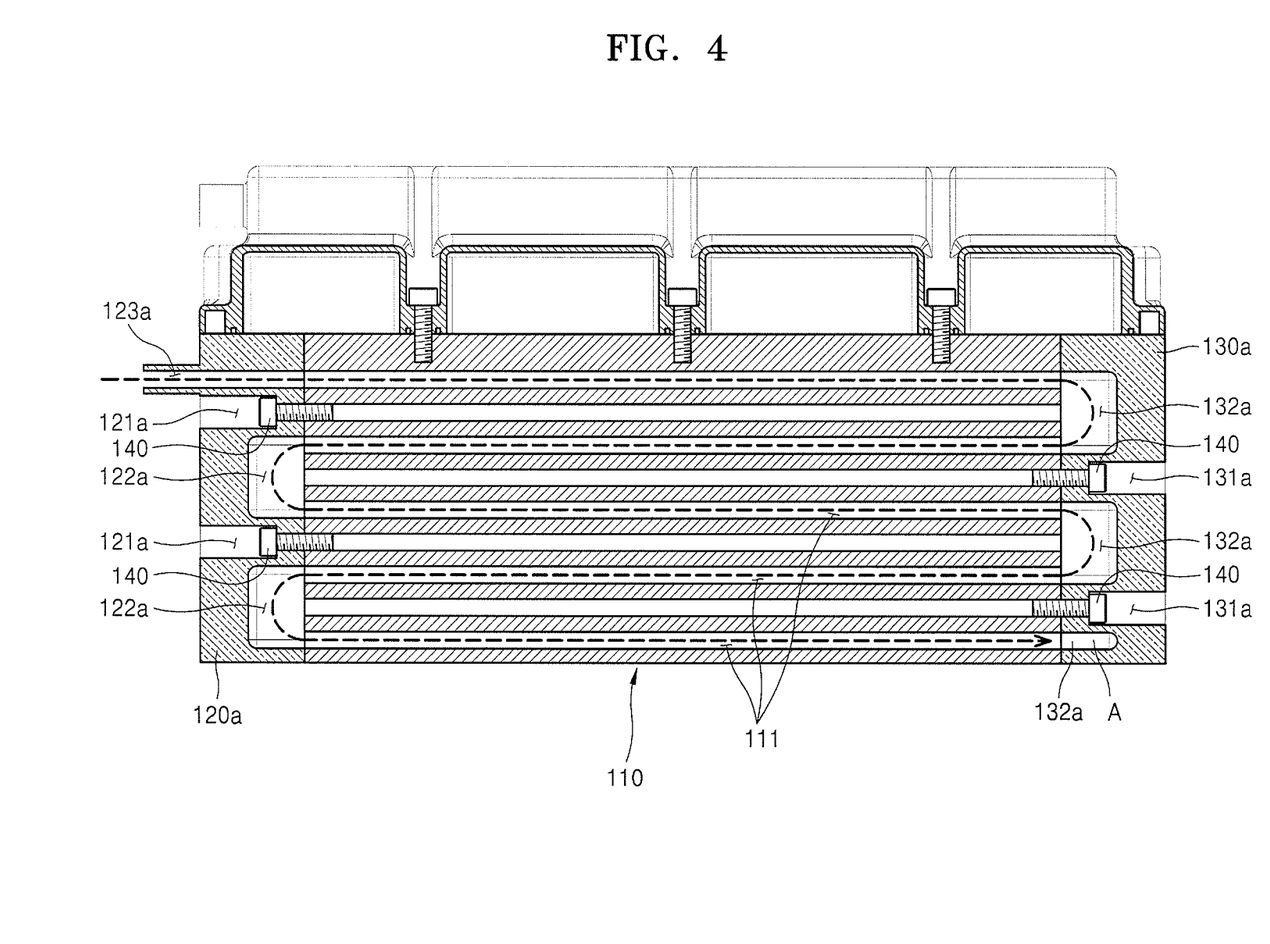
FIG. 4 is a cut-away side view obtained by cutting a lateral side of the battery pack cooling device of FIG. 3 in a first direction to illustrate a specific flow of a fluid.
Figure 5:
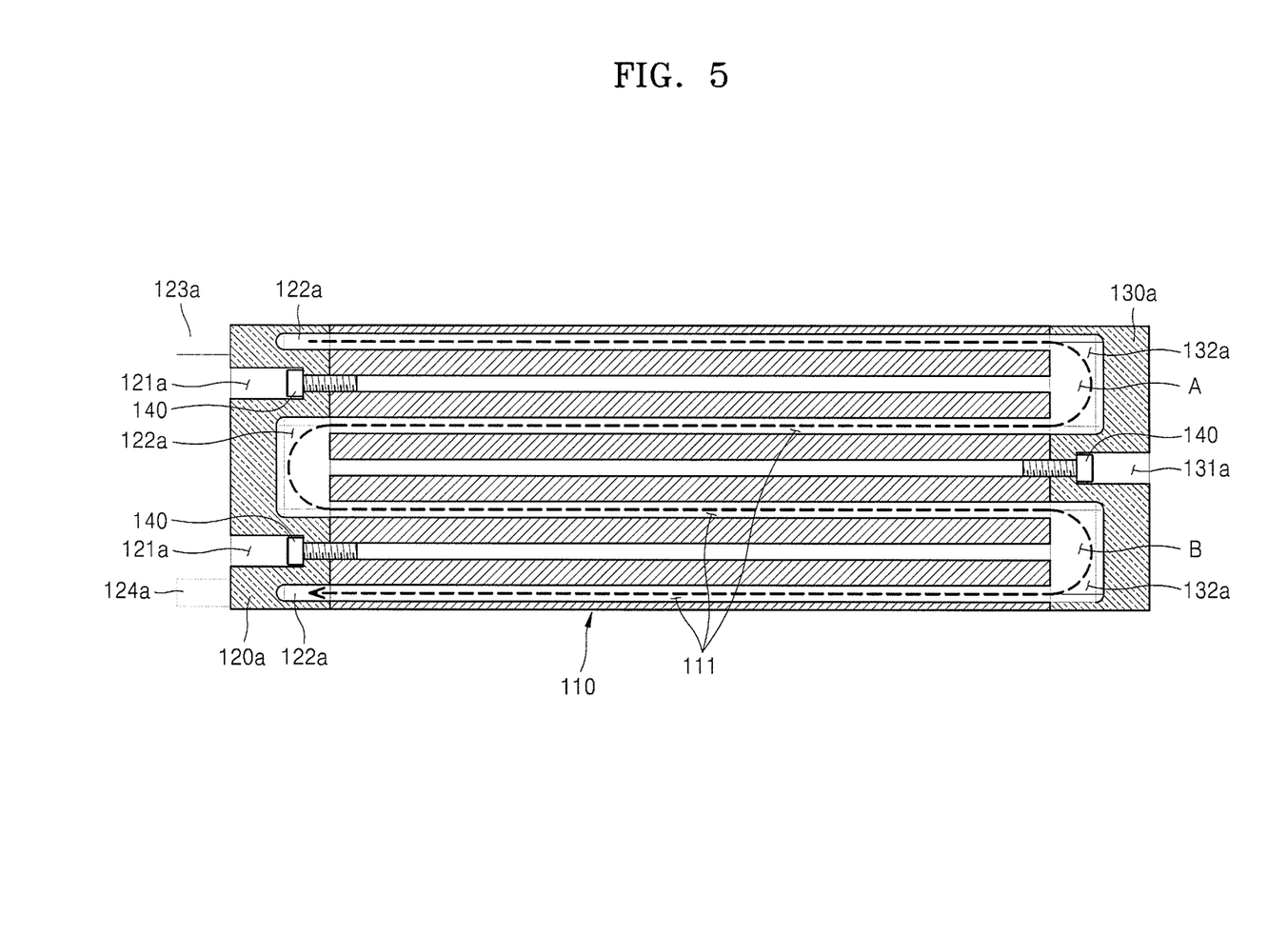
FIG. 5 is a cut-away side view obtained by cutting a lower side of the battery pack cooling device of FIG. 3 in the first direction to illustrate a specific flow of a fluid.

FIG. 3 is a cut-away perspective view illustrating a first coupling structure of the battery pack cooling device 100 shown in FIG. 1 in the first direction to illustrate a specific flow of a fluid, and FIG. 5 is a cut-away side view obtained by cutting a lower side of the battery pack cooling device 100 of FIG. 3 in the first direction to illustrate a specific flow of a fluid. Hereinafter, the configuration and operation of a "water cooling type" battery pack cooling device 100 will be described in detail with reference to FIGS. 3 to 5.

FIGS. 3 to 5 illustrate the case in which the first sub-housings 120a and the second sub-housing 130a corresponding to the first set of the first sub-housing 120 and the second sub-housing 130 shown in FIG. 1 are respectively installed on both sides of the housing 110.

Specifically, referring to FIGS. 3 to 5, a first coupling hole 121a of the first sub-housing 120a and a second coupling hole 131a of the second sub-housing 130a may not be aligned with each other in the first direction. In addition, a first guide hole 122a of the first sub-housing 120a and a second guide hole 132a of the second sub-housing 130a may partially overlap each other in the first direction. Specifically, the first guide hole 122a and the second guide hole 132a may be arranged to share one flow passage 111.

In addition, the first sub-housing 120a may further include: a first inlet 123a which overlaps at least one of the flow passages 111 in the first direction and into which a fluid is introduced; and a first outlet 124a which overlaps one of the flow passages 111 in the first direction and through which the fluid used to cool the battery cells C is discharged to the outside.

Here, the first inlet 123a and the first outlet 124a may be formed on both sides of the first sub-housing 120a in a second direction crossing the first direction. That is, cooling water may be introduced through the first inlet 123a into one of the flow passages 111 that communicates with the first inlet 123a and may sequentially flow along one side and the other side of the housing 110 through the flow passages 111, and then the cooling water may be discharged through the first outlet 124a.

FIG. 4 is view obtained by cutting away sides of the first sub-housing 120a, the housing 110, and the second sub-housing 130a to illustrate a specific flow of a fluid flowing along the flow passages 111, the first guide hole 122a, and the second guide hole 132a. In addition, FIG. 5 is a view in which a fluid introduced through the second guide hole 132a corresponding to reference numeral A flows along a flow passage 111 arranged in a lower side of the housing 110 to another second guide hole 132a corresponding to reference numeral B. In addition, although not shown in the drawings, the flow of the fluid along the other sides of the first sub-housing 120a, the housing 110, and the second sub-housing 130a at which the first outlet 124a is located may be similar to that shown in FIG. 4, and then as described above, the fluid may be discharged to the outside through the first outlet 124a.

Referring to FIG. 4, a fluid is introduced through the first inlet 123a and starts to flow along the flow passage 111 communicating with the first inlet 123a. The fluid flows along the flow passage 111, which communicates with the first inlet 123a, toward the second sub-housing 130a and enters the second guide hole 132a of the second sub-housing 130a. Since the second guide hole 132a does not penetrate the second sub-housing 130a, the fluid that has entered the second guide hole 132a flows back toward the first sub-housing 120a along another flow passage 111 different from the flow passage 111 communicating with the first inlet 123a. That is, the fluid introduced into the flow passage 111 through the first inlet 123a may turn once at the second guide hole 132a and may then flow.

As described above, a portion of the first guide hole 122a overlaps a portion of the second guide hole 132a such that the fluid flowing from the second guide hole 132a to the flow passage 111 may be guided to the first guide hole 122a. In addition, since the first guide hole 122a does not penetrate the first sub-housing 120a, the fluid introduced into the first guide hole 122a may turn again and may be then guided toward another second guide hole 132a along another flow passage 111 different from the above-mentioned flow passage 111. In this manner, the fluid introduced through the first inlet 123a may sequentially flow along the first guide hole 122a, the flow passage 111, and the second guide hole 132a, or along the second guide hole 132a, the flow passage 111, and the first guide hole 122a.

That is, as shown in FIGS. 3 to 5, when the battery pack cooling device 100 of the embodiment of the present disclosure has the first coupling structure, that is, when the first sub-housing 120a and the second sub-housing 130a of the first set are coupled to both sides of the housing 110, a fluid introduced through the first inlet 123a may turn at least once and may then flow while flowing along one side, a lower side, and the other side of the housing 110, and thereafter, the fluid may be discharged through the first outlet 124a.

Figure 6:
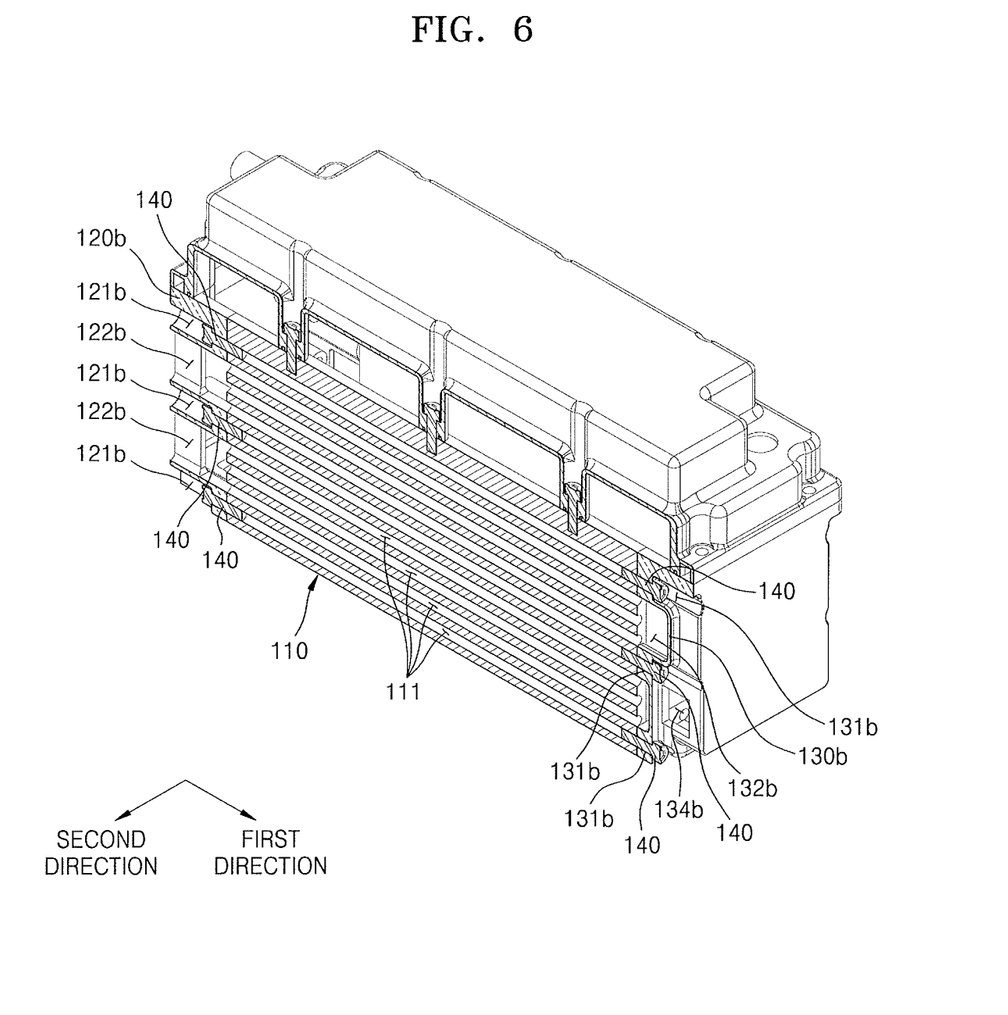
FIG. 6 is a cut-away perspective view illustrating a second coupling structure of the battery pack cooling device shown in FIG. 1.
Figure 7:
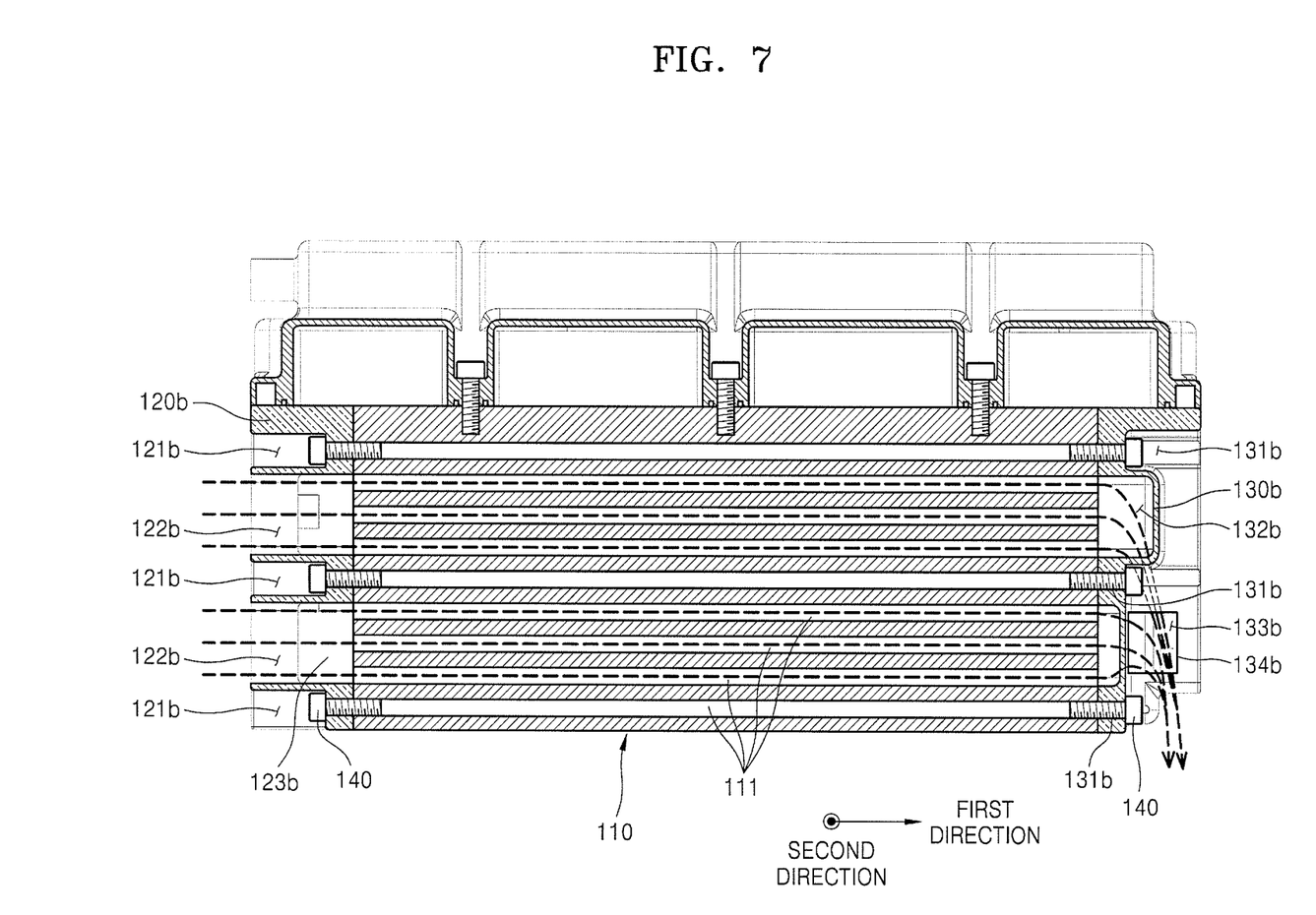
FIG. 7 is a cut-away side view obtained by cutting a lateral side of the battery pack cooling device of FIG. 6 in the first direction to illustrate a specific flow of a fluid.
Figure 8:
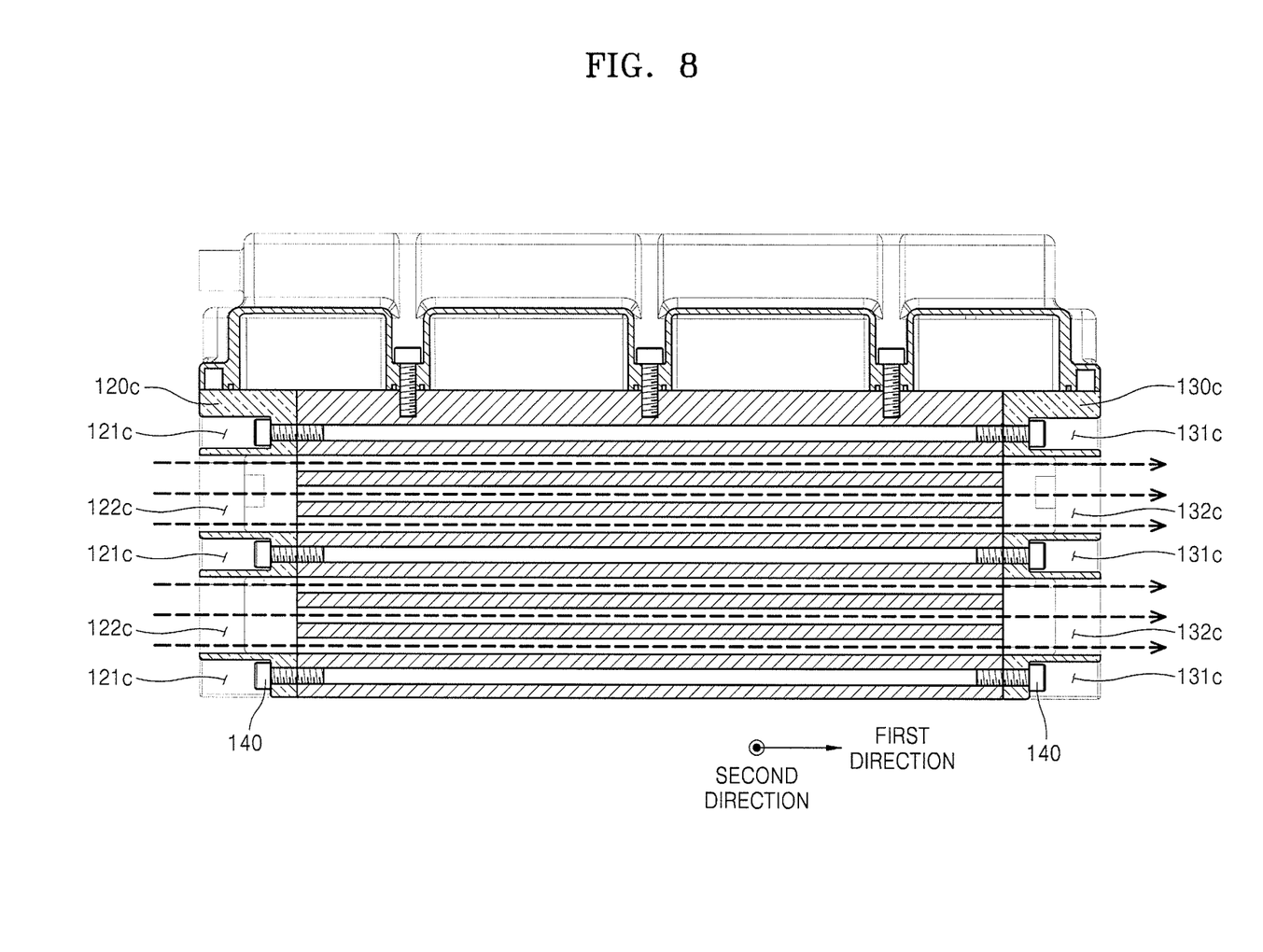
FIG. 8 is a cut-away side view illustrating another embodiment of the second sub-housing of the battery pack cooling device shown in FIG. 7.

FIG. 6 is a cut-away perspective view illustrating a second coupling structure of the battery pack cooling device 100 shown in FIG. 1 in the first direction to illustrate a specific flow of a fluid, and FIG. 8 is a cut-away side view illustrating another embodiment of the second sub-housing 130b of the battery pack cooling device 100 shown in FIG. 7. Hereinafter, the configuration and operation of an "air cooling type" battery pack cooling device 100 will be described in detail with reference to FIGS. 6 to 8.

FIGS. 6 to 8 illustrate the case in which the first sub-housing 120b and the second sub-housing 130b corresponding to the second set of the first sub-housing 120 and the second sub-housing 130 shown in FIG. 1 are respectively installed on both sides of the housing 110.

Specifically, referring to FIGS. 6 to 8, a first coupling hole 121b of the first sub-housing 120b and a second coupling hole 131b of the second sub-housing 130b may overlap each other in the first direction. In addition, a first guide hole 122b of the first sub-housing 120b may overlap a second guide hole 132b in the first direction.

The first sub-housing 120b may include the first guide hole 122b which penetrates the first sub-housing 120b in the first direction and functions as an inlet through which a fluid is introduced. For example, as shown in FIGS. 6 and 7, the first sub-housing 120b may include a plurality of first guide holes 122b, and a fluid may be introduced into the flow passages 111 of the housing 110 through the first guide holes 122b.

In addition, the first guide hole 122b may be partially open in the second direction. Owing to this structure, a portion of a fluid introduced through the first guide hole 122b may flow along flow passages 111 in the first direction, and another portion of the fluid may be guided in the second direction to a first internal chamber 123b provided in the first sub-housing 120b. The other portion of the fluid guided to the first internal chamber 123b may flow to an empty space formed in the cover CV of a battery pack (not shown) and may then be guided in the first direction to the second sub-housing 130b and a second internal chamber 133b of the second sub-housing 130b.

The second guide hole 132b may not penetrate the second sub-housing 130b in the first direction (refer to FIGS. 6 and 7). In addition, the second guide hole 132b may be partially open in the second direction such that a fluid delivered from the flow passages 111 to the second guide hole 132b may flow in the second direction and may be guided to the second internal chamber 133b provided in the second sub-housing 130b. In addition, the second guide hole 132b may further include a second outlet 134b to discharge the fluid to the outside.

According to this structure, when the battery cells C are cooled with air, air introduced through the first guide hole 122b may be guided to the second guide hole 132b through the flow passages 111 and collected in the second internal chamber 133b, and the air collected in the second internal chamber 133b may be discharged to the outside through the second outlet 134b. That is, when the first sub-housing 120b and the second sub-housing 130b corresponding to the second set are respectively installed on both sides of the housing 110 to use air as a cooling fluid, the fluid introduced through the first guide hole 122b may cool the battery cells C while flowing straight along the flow passages 111 in the first direction to the second guide hole 132b.

In addition, the "air cooling type" battery pack cooling device 100 may further include a blower member 170 (refer to FIG. 1) to force the fluid to flow. The blower member 170 may be provided in at least one of the first internal chamber 123b and the second internal chamber 133b. For example, referring to FIG. 1, the blower member 170 is installed in the second internal chamber 133b of the second sub-housing 130b in which the second outlet 134b is formed. However, embodiments of the present disclosure are not limited thereto, and the blower member 170 may be installed in the first internal chamber 123b of the first sub-housing 120b.

In detail, referring to FIG. 6, the second outlet 134b of the second sub-housing 130b may be open in the second direction. The reason for this structure is to improve ease of design by equal-direction installation because an outlet (not shown) of the blower member 170 is oriented to discharge the fluid in the second direction. However, this is an example, and the second outlet 134b may be open in the first direction. In addition, besides the first and second directions, the second outlet 134b may be open in a third direction crossing the first and second directions.

The reason for this is that it is possible to discharge the fluid collected in the second internal chamber 133b in any direction. The fluid introduced through the first guide hole 122b absorbs heat generated at the battery cells C while flowing along the flow passages 111, and then the fluid is collected in the second internal chamber 133b through the second guide hole 132b. In this case, since the main function of the second outlet 134b is to discharge the fluid collected in the second internal chamber 133b to the outside, it is unnecessary to limit the direction in which the fluid is discharged through the second outlet 134b.

For example, referring to FIG. 8, a second guide hole 132c may penetrate the second sub-housings 130c in the first direction. In this case, a fluid introduced through a first guide hole 122c and having passed through flow passages 111 may be discharged to the outside through the second guide hole 132c. That is, the second guide hole 132c may have the same function as the second outlet 134b shown in FIGS. 6 and 7.

The second outlet 134b that is shown in FIGS. 6 and 7 and the second guide hole 132c that is shown in FIG. 8 and functions as an outlet may have a common structure (not shown). That is, even in a state in which the second outlet 134b is formed in the second sub-housing 130b as shown in FIGS. 6 and 7, the second guide hole 132b may penetrate the second sub-housing 130b in the first direction. In this structure, a fluid introduced through the second guide hole 132b may be collected in the second internal chamber 133b and may be discharged to the outside through the second outlet 134b and also through the second guide hole 132b.

In the battery pack cooling device 100 having the above-described structure according to the embodiments of the present disclosure, a water cooling type and an air cooling type which are main types for cooling the battery cells C may be selectively applied to the housing 110. That is, the flow passages 111, which are commonly used in the water cooling type and the air cooling type, are formed in the housing 110, and the first sub-housing 120 and the second sub-housing 130 are installed on both sides of the housing 110 in a replaceable manner such that the water cooling type and the air cooling type may be selectively implemented.

Owing to this structure, the water cooling type and the air cooling type may be selectively applied according to a required degree of cooling performance for the battery cells C, thereby reducing the number and total weight of necessary components and a space for installing components.

While embodiments of the present disclosure have been described with reference to the accompanying drawings, these embodiments are for illustrative purposes only, and it will be understood by those of ordinary skill in the art that various changes and modifications may be made therefrom. Therefore, the scope and spirit of the present disclosure should be defined by the following claims.

INDUSTRIAL APPLICABILITY

As described above, according to the battery pack cooling device of the embodiments of the present disclosure, the first and second sub-housings having different structures may be installed on lateral sides of the housing in a replaceable manner according to a required degree of cooling performance for the battery cells, and thus, cooling methods may be selectively applied.

The invention claimed is:

1. A device for cooling a battery pack, the device comprising:
   a housing including a plurality of flow passages extending in a first direction;
   a first sub-housing provided on the housing in the first direction; and
   a second sub-housing arranged opposite the first sub-housing in the first direction and provided on the housing,
   wherein the first sub-housing includes:
      a first coupling hole communicating with a first one of the plurality of flow passages, a removable first coupling member extending into the first coupling hole and extending only partially into the first one of the plurality of flow passages, and
      a first guide hole communicating with at least a second one of the plurality of flow passages, the second one of the plurality of flow passages being different from the first one of the plurality of flow passages,
   wherein the second sub-housing includes:
      a second coupling hole communicating with a third one of the plurality of flow passages, a removable second coupling member extending into the second coupling hole and extending only partially into the third one of the plurality of flow passages, and
      a second guide hole communicating with at least a fourth one of the plurality of flow passages, the fourth one of the plurality of flow passages being different from the third one of the plurality of flow passages, and wherein a path of a fluid flowing in the plurality of flow passages varies according to installation positions of the first and second coupling members inserted into the first and second coupling holes.

2. The device of claim 1, further comprising:
a first sealing member between the housing and the first sub-housing; and
a second sealing member between the housing and the second sub-housing.

3. The device of claim 2, wherein the first and second sealing members include a plurality of communication holes that communicate with the plurality of flow passages.

4. The device of claim 1, wherein the first and second coupling holes are not aligned with each other in the first direction.

5. The device of claim 1, wherein:
the first sub-housing further includes:
a first inlet through which the fluid is introduced and which overlaps at least one of the plurality of flow passages in the first direction; and
a first outlet through which the fluid is discharged and which overlaps at least one of the plurality of flow passages in the first direction, and
the first inlet and the first outlet are provided on both sides of the first sub-housing in a second direction crossing the first direction.

6. The device of claim 1, wherein the first and second guide holes only partially overlap each other in the first direction.

7. The device of claim 1, wherein a width of the first guide hole in the first direction is smaller than a width of the first sub-housing in the first direction, and a width of the second guide hole in the first direction is smaller than a width of the second sub-housing in the first direction.

8. The device of claim 1, wherein the first and second coupling holes overlap each other in the first direction, and the first and second guide holes overlap each other in the first direction.

9. The device of claim 1, wherein:
the first guide hole penetrates the first sub-housing in the first direction and is partially open in a second direction crossing the first direction such that a portion of the fluid introduced into the first guide hole is guided to some of the plurality of flow passages in the first direction and another portion of the fluid introduced into the first guide hole is guided in the second direction to a first internal chamber provided in the first sub-housing, and
the second guide hole penetrates the second sub-housing in the first direction and is partially open in the second direction such that a portion of the fluid delivered from the plurality of flow passages to the second guide hole is discharged outside and another portion of the fluid delivered from the plurality of flow passages to the second guide hole is guided to a second internal chamber provided in the second sub-housing.

10. The device of claim 1, wherein:
the second sub-housing further includes a second outlet through which the fluid is discharged outside,
the first guide hole penetrates the first sub-housing in the first direction and is partially open in a second direction crossing the first direction such that a portion of the fluid introduced into the first guide hole is guided to some of the plurality of flow passages in the first direction and another portion of the fluid introduced into the first guide hole is guided in the second direction to a first internal chamber provided in the first sub-housing,
the second guide hole does not penetrate the second sub-housing in the first direction and is partially open in the second direction such that the fluid delivered from the plurality of flow passages to the second guide hole is guided to a second internal chamber provided in the second sub-housing, and
the fluid collected in the second internal chamber is discharged outside through the second outlet.

11. The device of claim 10, further comprising a blower member provided in at least one of the first and second internal chambers.

12. The device of claim 1, wherein the first and second coupling members connect together the plurality of flow passages, the first guide hole, and the second guide hole in such a manner that a fluid turns at least once while flowing therein.

13. The device of claim 1, wherein the first and second coupling members connect together the first guide hole, the plurality of flow passages, and the second guide hole in such a manner that a fluid flows straight in the first direction.

14. The device of claim 1, wherein the first and second sub-housings are removable from the housing, the first and second sub-housings being attachable to the housing via the first and second coupling members, respectively.

15. The device of claim 1, wherein the plurality of flow passages extends within sidewalls and a bottom wall of the housing.

16. The device of claim 6, wherein each of the first and second guide holes connects two of the plurality of flow passages, the first and second guide holes share a single one of the two of the plurality of flow passages.

* * * * *